United States Patent [19]

Takahashi

[11] Patent Number: 4,555,753
[45] Date of Patent: Nov. 26, 1985

[54] RECTIFIER CIRCUIT WITH TWO RECTIFIERS

[75] Inventor: Makoto Takahashi, Tottori, Japan

[73] Assignee: TDK Co., Ltd., Tokyo, Japan

[21] Appl. No.: 546,269

[22] Filed: Oct. 28, 1983

[30] Foreign Application Priority Data

Oct. 28, 1982 [JP] Japan ................... 57-188240

[51] Int. Cl.$^4$ ........................................... H02M 7/06
[52] U.S. Cl. ..................................... 363/126; 363/70
[58] Field of Search ........................... 363/68–70, 363/44–48, 101, 126; 307/1, 4, 82; 315/205, 223

[56] References Cited

U.S. PATENT DOCUMENTS

| 3,579,085 | 5/1971 | Grodinsky | 363/70 |
| 4,084,217 | 4/1978 | Brandli et al. | 363/126 X |
| 4,109,307 | 8/1978 | Knoll | 363/101 |
| 4,222,096 | 9/1980 | Capewell | 363/126 X |

*Primary Examiner*—Peter S. Wong
*Attorney, Agent, or Firm*—Armstrong, Nikaido, Marmelstein & Kubovcik

[57] ABSTRACT

In addition to a conventional rectifier responsive to an input AC voltage, another or second rectifier is employed such that the input AC voltage is first reduced to be applied to the second rectifier. To reduce the input AC voltage a transformer or one or more capacitors may be used. Furthermore, when one or more capacitors are used, the input AC voltage may be once boosted by way of a boosting transformer. A capacitor is connected across output terminals of the second rectifier to be charged with a rectified current therefrom. The output terminals of the first rectifier are respectively connected to output terminals of the first rectifier so that two different DC voltages are combined or superposed one on another. A diode is employed to prevent the capacitor from being charged with a current from the first rectifier. As a result of combination or superposition of two differently rectified voltages, a resultant output DC voltage is obtained where the DC voltage is continuously kept above a predetermined voltage. With this arrangement input AC waveform is improved so that power factor is improved.

7 Claims, 13 Drawing Figures

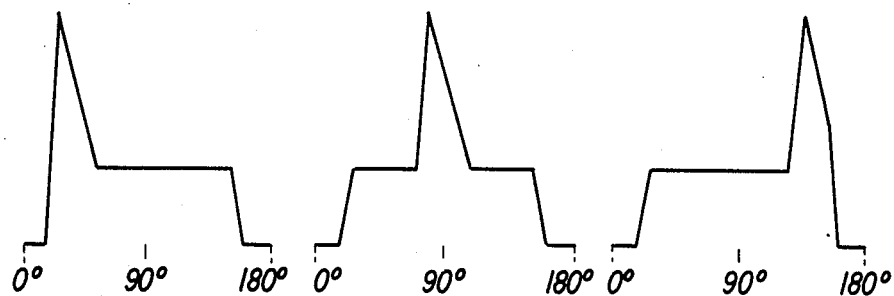
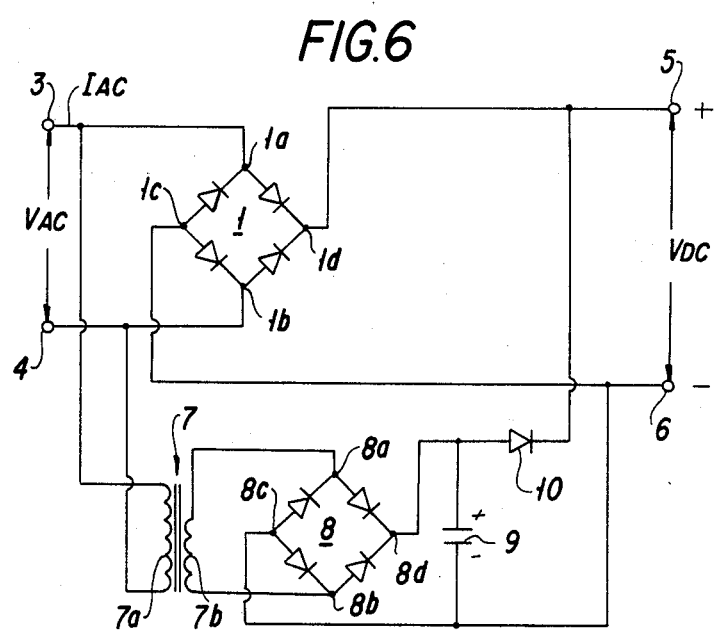

RECTIFIER CIRCUIT WITH TWO RECTIFIERS

BACKGROUND OF THE INVENTION

This invention relates generally to rectifier circuits used as a power source suitable for discharge lamps or the like, and particularly, the present invention relates to rectifier circuits of high efficiency and high power factor.

As a lighting or driving device for use with a discharge lamp, such as a fluorescent lamp, is known a high-frequency lighting device which is advantageous for improving luminous efficiency, for reducing loss in electrical power, and for reducing the size of its stabilizer. In such a high-frequency lighting device, as shown in FIG. 1, a power source having a well-known rectifier circuit, which comprises a rectifier and a capacitor, is used such that an input AC voltage $V_{AC}$ (see FIG. 2 waveform A) applied across input terminals 3 and 4 is rectified by way of a rectifier 1, and then the rectified voltage is smoothed by way of a smoothing capacitor 2 so as to develop a DC voltage $V_{DC}$ across output terminals 5 and 6 (see FIG. 2 waveform B). This output DC voltage $V_{DC}$ is used to drive a high-frequency oscillator (not shown) which energizes a discharge lamp (not shown), and it is generally known in the art that such a high-frequency lighting device provides 15 to 20 percent higher luminous efficiency when compared to low-frequency lighting technique using 50 or 60 Hz commercial AC source.

However, in the above-mentioned rectifier circuit of FIG. 1, since the smoothing capacitor 2 is charged with a charging current only when the input AC voltage $V_{AC}$ exceeds the voltage across the smoothing capacitor 2, an input alternating current $I_{AC}$ supplied to the rectifier 1 has a pulse-like waveform. As a result, the power factor viewed from the AC source shows a very low value, such as 50–60 percent, which is undesirable in view of working efficiency of wirings.

In order to obviate such a drawback, therefore, the smoothing capacitor 2 of FIG. 1 may be removed from the rectifying circuit, and such a rectifying circuit without a smoothing capacitor is disclosed in TOSHIBA REVIEW VOL. 34, No. 7, page 585 (published on July 1, 1979), titled "New Series of Electronic energy-saving ballasts, super ballasts". FIG. 3 shows such a conventional arrangement, while FIG. 4 is a waveform diagram showing the operation of the arrangement of FIG. 3. In the arrangement of FIG. 3, since no smoothing capacitor is employed, an output DC voltage $V_{DC}$ developed across the output terminals 5 and 6 includes ripples (see FIG. 4 waveform B) so that the high-frequency oscillator responsive to the output voltage $V_{DC}$ is driven by a ripple voltage. Due to the absence of a smoothing capacitor, the input alternating current $I_{AC}$ is a sinusoidal wave as shown in FIG. 4 waveform C, and therefore, power factor is improved when compared to the arrangement of FIG. 1.

However, the arrangement of FIG. 3 suffers from a low luminous efficiency and low effective current as follows. Namely, in the arrangement of FIG. 3 the lamp current flowing through the discharge lamp or tube is difficult to immediately rise if it is made zero and if sufficient energy is not supplied thereto thereafter. Such a slow or gentle rising of the lamp current results in the presence of a duration in which an effective current does not flow through the discharge tube, which duration will be referred to as a dark angle region hereinafter. During such a dark angle region or period, are discharge within the discharge tube is interrupted, resulting in decrease in luminous flux and therefore in brightness. Thus, the luminous efficiency expressed in terms of Lm/Win of the discharge lamp becomes low, wherein Lm is the luminous flux emitted from the discharge lamp, and Win is the consumed power viewed from the power source.

The present inventor has divised a rectifier circuit in which such a dark angle region is eliminated for improving luminous efficiency without deteriorating the power factor, prior to the present invention and filed a patent application No. 56-195978 at Japanese Patent Office. According to the inventor's prior rectifier circuit, a capacitor having an extremely small electrostatic capacitance, such as 15 μF or less, is provided to the output side of the recitfier circuit, and the discharging period of the capacitor is set to the dark angle region which appears when a discharge tube is driven by only the rectifier so that the dark angle region is filled with a discharging current from the capacitor. With this arrangement, it is possible to improve the luminous efficiency without deteriorating the power factor.

However, when it is intended to further improve the power factor with the above arrangement, the electrostatic capacitance of the capacitor has to be reduced, while an extremely small capacitance results in the occurrence of small-current regions which lower luminous efficiency. Furthermore, since the capacitor is charged, the waveform of the input AC turns such that a pulse-like wave is superposed upon a gradually reducing wave, and therefore, the power factor is lowered thereby. Namely, there is a limit in power factor improvement according to the above structure.

In order to remove dark angle regions with a high power factor being maintained, the output voltage from a rectifier may be applied, as disclosed in U.S. Pat. No. 4,109,307, to a capacitor via an element having a large inductance, while the capacitor is discharged via a diode. In this arrangement, although power factor is improved since the input alternating current takes a waveform of a gentle rectangle inasmuch as pulses are merely included, there is a disadvantage that power consumption is large due to ohmic loss consumed by a winding conductor which constitutes the above-mentioned inductance element.

SUMMARY OF THE INVENTION

The present invention has been developed in order to remove the above-described drawbacks inherent to the conventional rectifiers and already-divised rectifiers.

It is, therefore, an object of the present invention to provide a new and useful rectifier circuit which ensures low power consumption and an improved power factor, while a high luminous efficiency is provided when discharge lamps or the like are driven by a power source including the rectifier circuit of the invention.

According to a feature of the present invention first and second rectifiers are employed where the first rectifier is directly responsive to an input AC voltage to produce a rectified voltage including ripples, and the second rectifier is responsive to a reduced voltage produced by way of a voltage-reducing device, such as a transformer, one or more capacitors or the like, which is responsive to the input AC voltage. An output rectified voltage from the second rectifier is applied to a capacitor to charge the same, and the voltage across the capacitor is combined with the ripple voltage from the first rectifier for producing a resultant output DC voltage. A diode is interposed between an output terminal of the first rectifier and a terminal of the capacitor connected across the output terminals of the second rectifier so as to prevent the capacitor from being charged with a current from the first rectifier.

According to another feature of the present invention, when one or more capacitors are used as the voltage-reducing device, a boosting transformer responsive to the input AC voltage is used so that an AC voltage higher than the input AC voltage is applied to a series circuit of the capacitors and the second rectifier.

According to a further feature of the present invention another diode is connected between a terminal of the capacitor connected across the output terminals of the second rectifier and an output terminal of the first rectifier in the case that only one capacitor is used as the voltage-reducing device.

According to still another feature of the present invention, while the waveform of an input alternating current is such that a pulse-like waveform is superposed upon a rectangular waveform, the power factor is improved since the pulse-like waveform is located at the middle or close to the middle of the rectangular waveform.

BRIEF DESCRIPTION OF THE DRAWINGS

The object and features of the present invention will become more readily apparent from the following detailed description of the preferred embodiments taken in conjunction with the accompanying drawings in which:

FIGS. 5A, 5B and 5C are waveform charts useful for understanding the present invention;

FIG. 6 is a schematic diagram of a first embodiment of the rectifier circuit according to the present invention;

The same or corresponding elements and parts are designated at like reference numerals throughout the drawings.

DETAILED DESCRIPTION OF THE INVENTION

Figure 1:
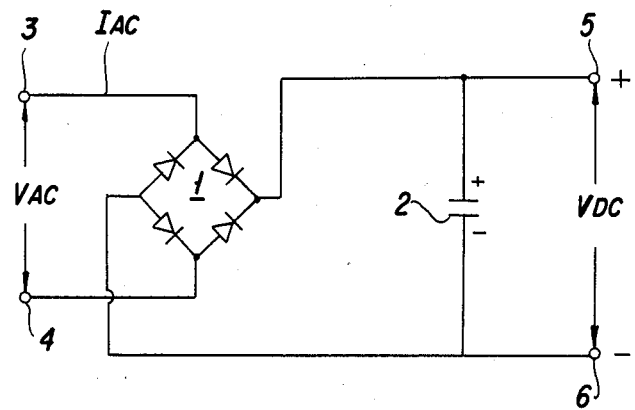
FIG. 1 is a diagram showing a conventional rectifier circuit.
Figure 2:
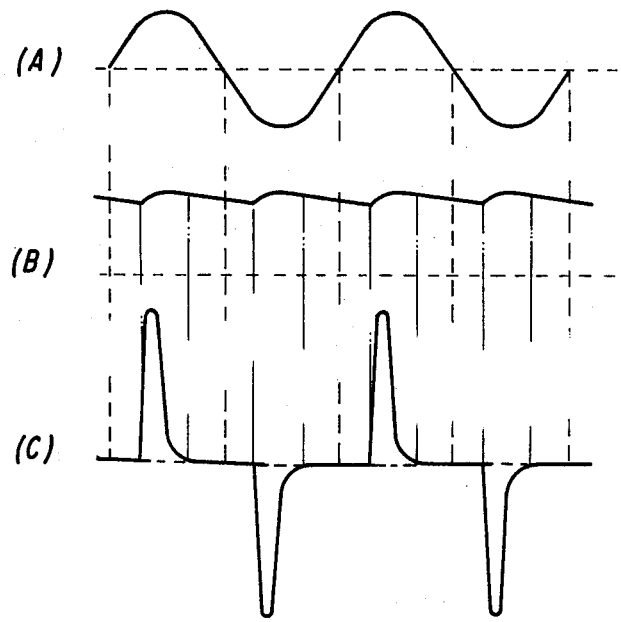
FIG. 2 is a waveform chart useful for understanding the operation of the conventional rectifier circuit of FIG. 1.
Figure 3:
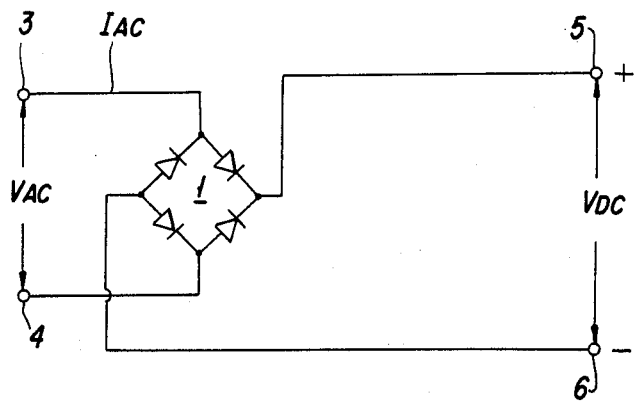
FIG. 3 is a diagram showing another conventional rectifier circuit.
Figure 4:
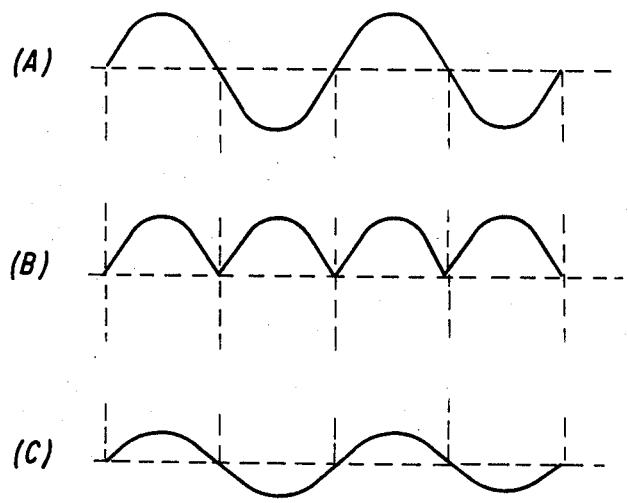
FIG. 4 is a waveform chart useful for understanding the operation of the conventional rectifier circuit of FIG. 3.

Referring now to FIG. 6 a diagram of a first embodiment rectifer circuit according to the present invention is shown. The circuit comprises a first rectifier 1, a second rectifier 8, a voltage-reducing transformer 7, a smoothing capacitor 9, and a diode 10. The references 3 and 4 indicate AC input terminals for receiving AC power $V_{AC}$ from an unshown AC power source, such as a commercial AC power line. The references 5 and 6 are DC output terminals from which an output DC voltage $V_{DC}$ will be derived to be fed to an unshown high-frequency oscillator which drives unshown discharge lamps or the like. Each of the first and second rectifiers 1 and 8 comprises a well known semiconductor diode bridge having two input terminals 1a, 1b and 8a, 8b and two output terminals 1c, 1d and 8c, 8d.

The AC input terminals 3 and 4 are respectively connected to the input terminals 1a and 1b of the first rectifier 1 and to a primary winding 7a of the transformer 7. The output terminals 1c and 1d of the first rectifier 1 are respectively connected to the DC output terminals 5 and 6. A sencondary winding 7b of the transformer 7 is connected across the input terminals 8a and 8b of the second rectifier 8 whose output terminals 8c and 8d are connected across the capacitor 9. Furthermore, the output terminal 8d is connected via the diode 10 to the DC output terminal 5, while the other output terminal 8d is connected directly to the DC output terminal 6. The direction of the diode 10 is such that its cathode is connected to the DC output terminal 5 to prevent a current from flowing from the first rectifier 1 to the capacitor 9.

The first embodiment rectifier circuit of FIG. 6 operates as follows. The input AC voltage $V_{AC}$ applied across the AC input terminals 3 and 4 is rectified by the first rectifier 1 to produce a ripple voltage across the DC output terminals 5 and 6. The AC voltage $V_{AC}$ applied to the transformer 7 is reduced thereby by 30 percent or so. Namely, when $V_{AC}$ is 100 volts for instance, the AC voltage developed across the secondary winding of the transformer is approximately 70 volts, and this voltage-reduced AC is applied to the second rectifier 8 to be rectified therein. As a result, another ripple voltage is obtained across the output terminals 8c and 8d of the second rectifier 8 to be applied across the capacitor 9 for charging the same.

Figure 7:
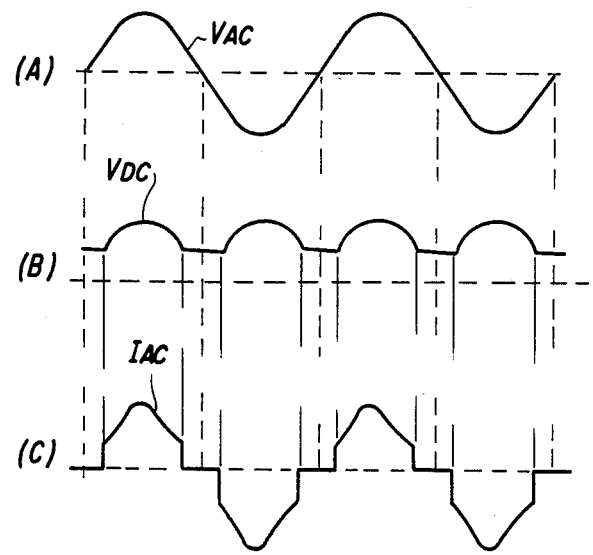
FIG. 7 is a waveform chart useful for understanding the operation of the rectifier circuit of FIG. 6.

When the ripple voltage from the first rectifier 1 is higher than the voltage across the capacitor 9, the ripple voltage appears across the DC output terminals 5 and 6 as it stands, while the diode 10 is inversely biased to be put in nonconductive state. On the other hand, when the ripple voltage becomes lower than the voltage across the capacitor 9, the diode 10 is rendered conductive to cause the capacitor 9 to start discharging via the diode 10. During the discharging period of the capacitor 9, the voltage across the capacitor 9, which voltage is substantially constant, appears across the DC output terminals 5 and 6. Accordingly, the DC voltage across the DC output terminals 5 and 6 has a waveform, as shown in FIG. 7 waveform B, such that the ripple voltage from the first rectifier 1 is superposed on the constant voltage across the capacitor 9. In other words, the ripple voltage waveform from the first rectifier 1 is filled with the constant voltage from the capacitor 9 each time the ripple voltage becomes lower than the constant voltage.

On the other hand, the input alternating current $I_{AC}$ becomes zero during the discharging period of the capacitor 9, and when the absolute value of the input AC voltage $V_{AC}$ increases so that the output ripple voltage from the first rectifier 1 exceeds the voltage across the capacitor 9, the input alternating current $I_{AC}$ flowing. Meanwhile, when the output ripple voltage from the second rectifier 8 exceeds the voltage across the capacitor 9, the input alternating current $I_{AC}$ suddenly increases due to charging to the capacitor 9. As a result, the input AC $I_{AC}$ exhibits a waveform such that a waveform having peaks is superposed on a rectantgular waveform as shown in FIG. 7 waveform C where each peak is located at a midway point between leading and trailing edges of each positive or negative going rectangular waveform.

As described in the above with reference to FIGS. 5A to 5C, the above-mentioned way of superposition serves to improvement in power factor. Furthermore, since the output DC voltage $V_{DC}$ across the output terminals 5 and 6 can be maintained above a predetermined voltage, which is determined by the voltage across the capacitor 9, no dark angle region occurs within the lamp current to the discharge lamp which is to be driven by an unshown high-frequency oscillator, and therefore, a high luminous efficiency of the discharge tube can be maintained. Moreover, since the electrostatic capacitance of the capacitor 9 hardly affects the power factor of the entire rectifier circuit, a capacitor having a relatively large electrostatic capacitance may be used as the capacitor 9. With the provison of such a large capacitance, the variation in voltage across the capacitor 9 may be reduced.

Figure 8:
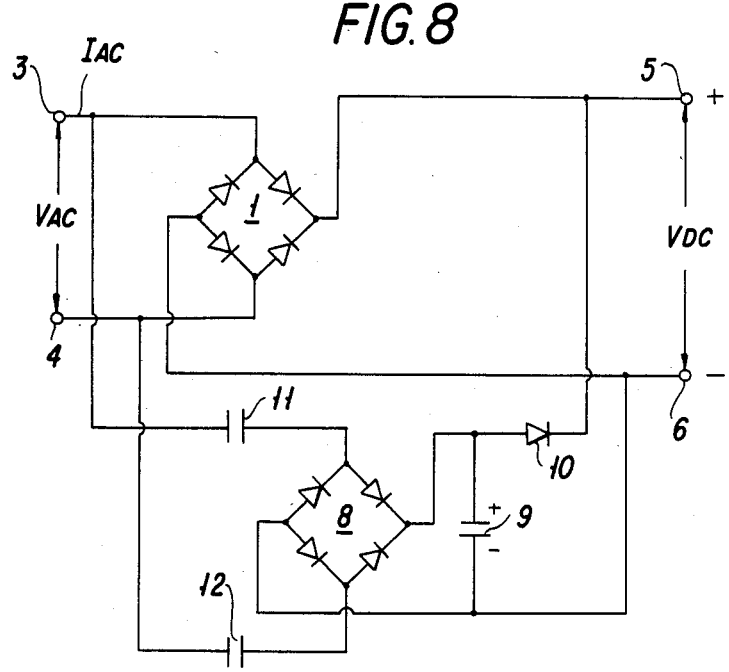
FIG. 8 is a schematic diagram of a second embodiment of the rectifier circuit according to the present invention.

FIG. 8 illustrates another or second embodiment of the present invention. The second embodiment differs from the first embodiment of FIG. 6 in that the transformer 7 is replaced with two capacitors 11 and 12. In other words, the second rectifier 8 receives the input AC voltage $V_{AC}$ via two capacitors 11 and 12 which are respectively interposed between the AC input terminal 3 and the input terminal 8a of the second rectifier 8, and between the other AC input terminal 4 and the other input terminal 8d of the second rectifier 8. With this arrangement a series circuit of the two capacitors 11 and 12 and the second rectifier 8 is formed where the capacitors 11 and 12 function as impedance elements which drop or reduce the voltage. As a result, the second rectifier 8 receives the input AC voltage $V_{AC}$ which is dropped by the capacitors 11 and 12. Namely, remaining circuits of FIG. 8 operate in the same manner as in the first embodiment of FIG. 6, developing an output DC voltage $V_{DC}$ (see FIG. 9 waveform B) which is substantially the same as $V_{DC}$ of FIG. 7 waveform B.

Figure 9:
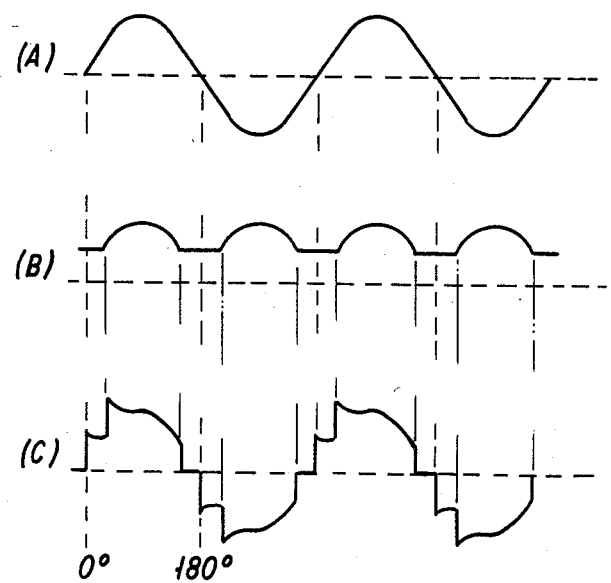
FIG. 9 is a waveform chart useful for understanding the operation of the rectifier circuit of FIG. 8.

However, the input alternating current $I_{AC}$ in the arrangement of FIG. 8 has a different waveform (see FIG. 9 waveform C) from that of FIG. 7 waveform C. Namely, the input alternating current $I_{AC}$ has a stepped rising in its waveform as shown in FIG. 9, where the waveform is such that a pulse-like waveform is superposed on a gently reducing waveform and the pulse-like waveform is located in the vicinity of the midway point of the positive or negative going input AC voltage $V_{AC}$ thereby providing a high power factor. The value of the capacitors 11 and 12 is preferably set to 6 F when an output current is 0.5 to 0.8 A. It is to be noted that a larger capacitance causes the decrease in power factor. The amplitude and phase angle of the pulse-like waveform may be suitably set in accordance with a desired power factor as follows.

According to experiments, when the amplitude of the pulse-like waveform is set to approximately three times the amplitude of the rectancgular waveform, a power factor of 90 percent is achieved when the phase angle is between 75 and 115 degrees. In the same manner when the amplitude of the pulse-like waveform is set to approximately twice the amplitude of the rectangular waveform, a power factor of 95 percent or over is achieved when the phase angle is between 75 and 115 degrees, and a power factor of 90 percent or over is achieved when the phase angle is between 45 and 135 degrees. In the above the phase angle is an angle measured from a zero-crossing point in the waveform of the input AC voltage $V_{AC}$ as shown in FIG. 9.

In addition to the arrangement of FIG. 8, another capaicitor (not shown) whose electrostatic capacitance is considerably smaller than that of capacitors 11 and 12, may be connected in parallel to the second rectifier 8 at its input side. With the provision of such an additional capacitor, noises are effectively suppressed. Furthermore, since no resisance or inductance is involved in the rectifier circuit of the second embodiment of FIG. 8, power consumption does not increase. When compared to the first embodiment of FIG. 6, it is to be noted that no ohmic loss, which occurs at the primary winding of the transformer 7 of FIG. 6, occurs in the second embodiment.

Figure 10:
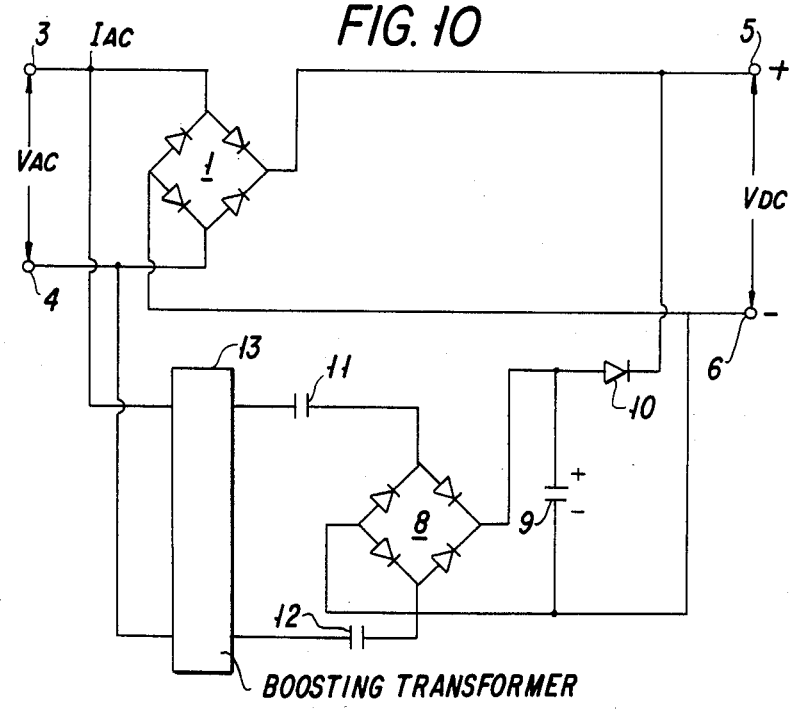
FIG. 10 is a schematic diagram of a third embodiment of the rectifier circuit according to the present invention.

FIG. 10 shows a third embodiment of the present invention. The third embodiment differs from the above-described second embodiment of FIG. 8 in that a boosting transformer 13 is additionally employed. Namely, the boosting transformer 13 is interposed between the AC input terminals 3 and 4 and the capacitors 11 and 12 so that the input AC voltage $V_{AC}$ is once increased to a given voltage by the boosting transformer 13 and then the boosted voltage is reduced by the capacitors 11 and 12 to be applied to the second rectifier 8. In the third embodiment, since the voltage applied to the series circuit of the capacitors 11 and 12 and the second rectifier 8 is higher than that in the second embodiment of FIG. 8, the electrostatic capacitance of the capacitors 11 and 12 may be reduced. As a result of the use of such smaller capacitors 11 and 12 the peak amplitude of the rising portion of the input alternating current $I_{AC}$ waveform becomes lower than that in FIG. 9 waveform C. Furthermore, due to the presence of inductance of the winding(s) of the boosting transformer 13, the stepped rising waveform is made dull to show a gentle waveform thereby leading to further improvement in power factor.

In the above-described second and third embodiments of FIGS. 8 and 10, although two capacitors 11 and 12 are employed to reduce the input AC voltage $V_{AC}$ before applying the same to the second rectifier 8, one of such two capacitors 11 and 12 may be omitted if desired.

Figure 11:
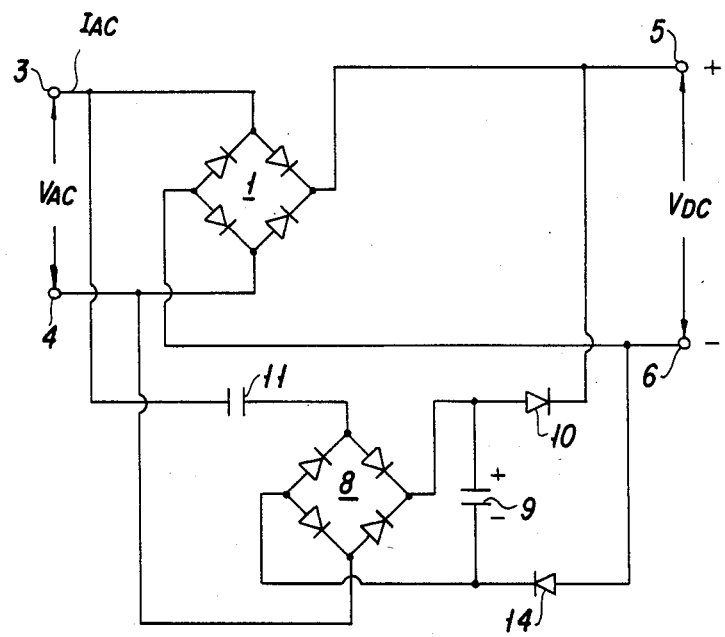
FIG. 11 is a schematic diagram of a fourth embodiment of the rectifier circuit according to the present invention.

Hence, reference is now made to FIG. 11 showing a fourth embodiment in which only a single capacitor 11 is used to reduce the input AC voltage $V_{AC}$. The fourth embodiment differs from the third embodiment in not only the number of voltage-reducing capacitors but also the provision of an additional diode 14 which is coupled between a negative terminal (−) of the capacitor 9 and the negative DC output terminal 6 in such a direction that the cathode of the diode 14 is connected to the capacitor 9. The diode 14 is provided to prevent a current from flowing from the capacitor 9 to the first rectifier 1. Namely, in the arrangement of FIG. 11, since only one capacitor 11 is connected in series with the second rectifier 8, the voltage-dividing ratio determined by the capacitances of the capacitor 11 and 9 alters in accordance with the direction of current flow therethrough. As a result, the voltage at the output terminal 8c of the second rectifier 8 with respect to the voltage at the negative DC output terminal 6 changes at each half cycle of the input AC voltage $V_{AC}$. As a result the voltage across the capacitor 9 varies and therefore, when the voltage at the negative terminal (−) of the capacitor 9 is higher than the voltage at the negative DC output terminal 6, an electric current tends to flow from the capacitor into the output teminal 1c of the first rectifier 1. The diode 14 is used to block such an undesirable circulating current.

Although the present invention has been described in connection with a recifier circuit used in a power source of a discharge tube or lamp, the instant invention is not limited to such a rectifier circuit. Namely, the present invention may be adapted to any rectifier circuits in which rectified voltage is smoothed where a high power factor of the rectifier circuit is desired.

From the foregoing it will be understood that the capacitor used for filling a dark angle region of a lamp current of a discharge tube with a discharging current does not deteriorate the power tactor. Furthermore since the charging timing of the capacitor is suitably set such that the input alternating current $I_{AC}$ has a waveform formed by superposing a pulse-like waveform on a rectangular waveform at the middle of the latter, a relatively large capacitance may be used, ensuring the elimination of the dark angle region. Therefore, it is possible to maintain a high luminous efficiency while the power factor is improved.

The above-described embodiments are just examples of the present invention, and therefore, it will be apparent for those skilled in the art that many modifications and variations may be made without departing from the spirit of the present invention.

What is claimed is:

1. A rectifier circuit for producing an output DC voltage from an input AC voltage, comprising:
   (a) a first full wave rectifier connected directly to said input AC voltage for rectifying the same, said first rectifier output being connected to a first pair of output terminals to provide an unfiltered output DC voltage;
   (b) a voltage reducing means connected to said input AC voltage for providing a voltage-reduced AC output;
   (c) a second full wave rectifier connected to said voltage-reduced AC output for rectifying the same to provide at a second pair of output terminals a reduced voltage DC output;
   (d) a smoothing capacitor connected across said second pair of output terminals; and
   (e) means connecting said first and second pair of output terminals including unidirectional current means whereby the combined DC voltage output during each half cycle of said input AC voltage has a peak value equal to the peak voltage of said unfiltered DC voltage and a minimum value equal to said reduced voltage DC output.

2. A rectifier circuit as claimed in claim 1, wherein said connecting means comprises a diode connected between one of said second output terminals and one of said first output terminals.

3. A rectifier circuit as claimed in claim 1, wherein said voltage reducing means comprises a transformer.

4. A rectifier circuit as claimed in claim 1, wherein said voltage reducing means comprises a capacitor connected in series with said second rectifier.

5. A rectifier circuit as claimed in claim 1, wherein said voltage reducing means comprises first and second capacitors connected in series with said second rectifier such that said second rectifier is interposed between said first and second capacitors.

6. A rectifier circuit as claimed in claim 5, further comprising a boosting transformer connected to said input AC voltage for applying said second rectifier with a boosted voltage via said first and second capacitors.

7. A rectifier circuit as claimed in claim 3, wherein said connecting means comprises a first diode connected between one of said output terminals of said second rectifier and an output terminal of said first rectifier, and a second diode connected between the other output terminal of said second recitifier and the other output terminal of said first rectifier.

* * * * *